United States Patent
Hunger

(10) Patent No.: US 10,088,045 B2
(45) Date of Patent: Oct. 2, 2018

(54) SEAL SET AND SEALING ARRANGEMENT COMPRISING AT LEAST ONE SEAL SET

(71) Applicant: Dr. Walter Hunger Beteiligungs GmbH & Co. Besitz KG, Wuerzburg (DE)

(72) Inventor: Ingrid Hunger, Lohr (DE)

(73) Assignee: Dr. Walter Hunger Beteiligungs GmbH & Co. Besitz KG, Wuerzburg (DE)

( * ) Notice: Subject to any disclaimer, the term of this patent is extended or adjusted under 35 U.S.C. 154(b) by 439 days.

(21) Appl. No.: 15/011,898

(22) Filed: Feb. 1, 2016

(65) Prior Publication Data

US 2016/0146347 A1    May 26, 2016

Related U.S. Application Data

(63) Continuation of application No. PCT/EP2014/054068, filed on Mar. 3, 2014.

(30) Foreign Application Priority Data

Aug. 5, 2013    (DE) .................. 10 2013 108 419

(51) Int. Cl.
   *F16J 15/32*    (2016.01)
   *F16J 9/20*    (2006.01)
   (Continued)

(52) U.S. Cl.
   CPC ............. *F16J 9/20* (2013.01); *F15B 15/1461* (2013.01); *F16J 9/26* (2013.01); *F16J 9/28* (2013.01); *F16J 15/3236* (2013.01); *F16J 15/56* (2013.01)

(58) Field of Classification Search
   CPC ......... F16J 15/32; F16J 15/166; F16J 15/3216
   See application file for complete search history.

(56) References Cited

U.S. PATENT DOCUMENTS 2,994,571 A * 8/1961 Peras ................... F16J 15/3284
                                                          277/437
3,495,843 A * 2/1970 Andersen ............. F16J 15/3216
                                                          277/505
(Continued)

FOREIGN PATENT DOCUMENTS

DE          948464 C    3/1956
DE         7304680 U    4/1973
(Continued)

OTHER PUBLICATIONS

International Preliminary Report on Patentability for corresponding International Application No. PCT/EP2014/054068, dated Feb. 18, 2016.

(Continued)

*Primary Examiner* — Vishal A Patel
(74) *Attorney, Agent, or Firm* — Jason H. Vick; Sheridan Ross, PC

(57) ABSTRACT

The disclosure relates to a seal set, and to a sealing arrangement comprising a seal set. The seal set is arranged for sealing a primary side against a secondary side and comprises a main body which is arranged to be received at a support part, and a slide ring for contacting a slide surface of a slide partner part, wherein the main body is arranged in an annular fashion and comprises a radial circumferential receiving groove for the slide ring, wherein further a radial circumferential sealing lip is provided at the main body, which is formed between the receiving groove for the slide ring and a secondary-side end of the main body, wherein the sealing lip comprises a tip region and a conical ring surface adjoining the tip region, and wherein the slide ring, in a mounted state, at least sectionally covers the receiving groove, a primary-side adjoining surface adjoining the receiving groove, and the conical ring surface.

20 Claims, 2 Drawing Sheets

(51) Int. Cl.
*F15B 15/14* (2006.01)
*F16J 15/3236* (2016.01)
*F16J 15/56* (2006.01)
*F16J 9/26* (2006.01)
*F16J 9/28* (2006.01)

(56) References Cited

U.S. PATENT DOCUMENTS

| | | | |
|---|---|---|---|
| 4,053,166 A | 10/1977 | Domkowski | |
| 4,067,584 A * | 1/1978 | Hunger | F16J 1/02 |
| | | | 277/451 |
| 4,195,854 A * | 4/1980 | Bertin | F16J 15/3216 |
| | | | 277/549 |
| 4,311,316 A | 1/1982 | Cather, Jr. | |
| 4,427,206 A * | 1/1984 | Sugiyama | F16J 15/3216 |
| | | | 277/568 |
| 5,183,271 A * | 2/1993 | Wada | F16J 15/3244 |
| | | | 277/351 |
| 5,979,904 A * | 11/1999 | Balsells | F16J 15/3236 |
| | | | 277/554 |
| 6,050,570 A | 4/2000 | Otto | |
| 6,173,961 B1 * | 1/2001 | Martin | B62D 5/12 |
| | | | 277/353 |
| 6,279,914 B1 * | 8/2001 | Yamanaka | F16J 15/3232 |
| | | | 277/394 |
| 6,367,812 B1 * | 4/2002 | Reinhardt | F16J 15/322 |
| | | | 277/572 |
| 6,988,733 B2 * | 1/2006 | Hatch | F16J 15/3228 |
| | | | 277/549 |
| 8,505,926 B2 * | 8/2013 | Toth | F16J 15/025 |
| | | | 277/569 |
| 2006/0006608 A1 * | 1/2006 | LaPlante | F16J 15/166 |
| | | | 277/569 |
| 2011/0140369 A1 | 6/2011 | Lenhert | |
| 2012/0286478 A1 | 11/2012 | Uesugi et al. | |

FOREIGN PATENT DOCUMENTS

| | | |
|---|---|---|
| DE | 2461455 A1 | 7/1976 |
| DE | 2844906 A1 | 4/1980 |
| EP | 1612461 A1 | 1/2006 |
| JP | 04-165168 | 6/1992 |

OTHER PUBLICATIONS

International Search Report for corresponding International Application No. PCT/EP2014/054068, dated May 16, 2014.

Written Opinion for corresponding 16, 2014 International Application No. PCT/EP2014/054068, dated May 16, 2014.

* cited by examiner

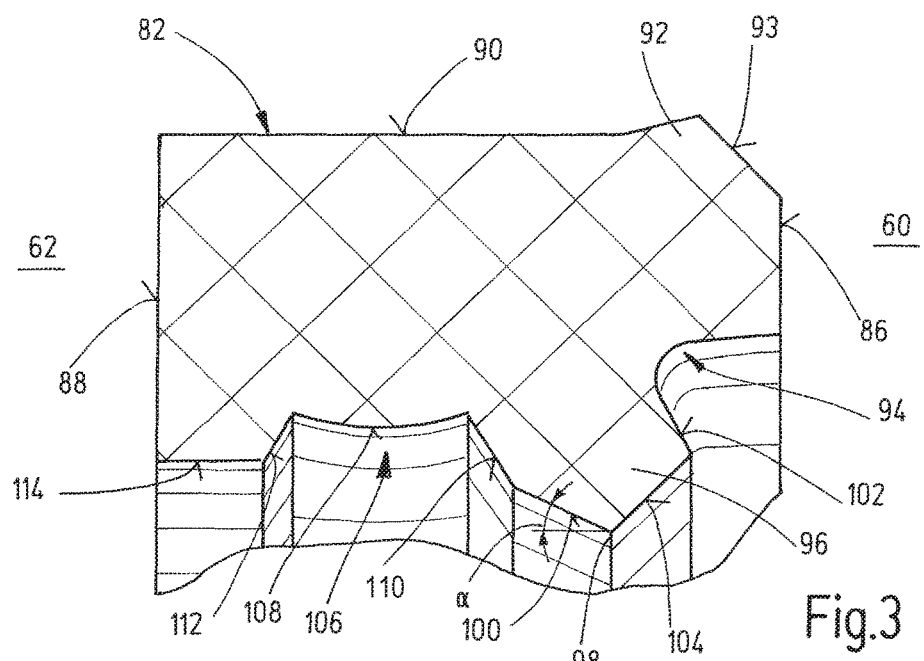
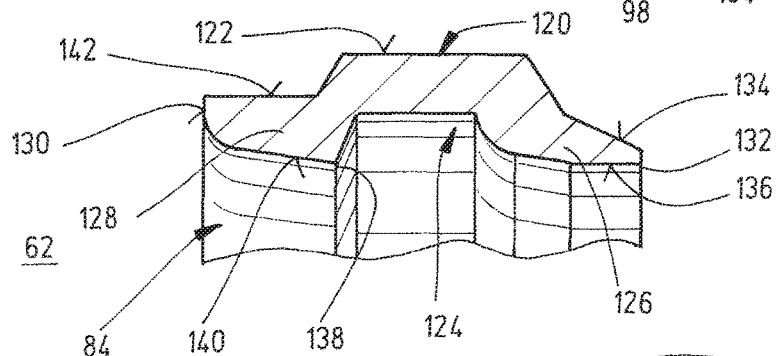
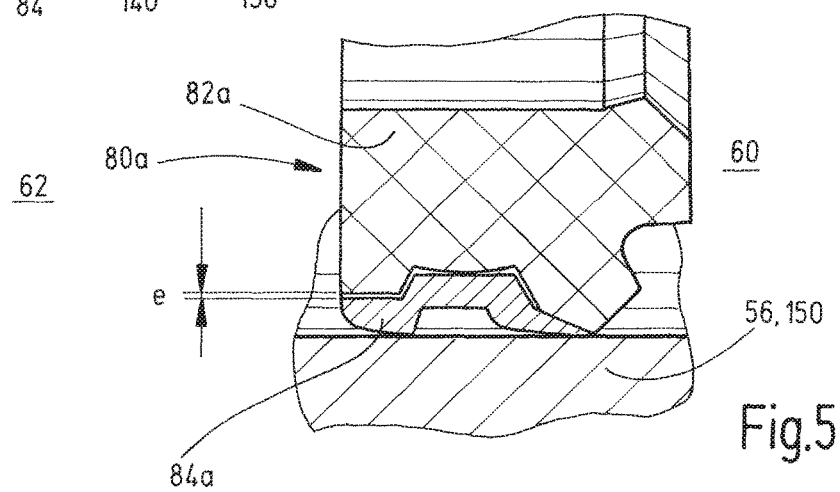

SEAL SET AND SEALING ARRANGEMENT COMPRISING AT LEAST ONE SEAL SET

CROSS-REFERENCES TO RELATED APPLICATIONS

This application is a continuation of International Patent Application PCT/EP2014/054068, filed on Mar. 3, 2014 designating the U.S., which international patent application has been published in German language and claims priority from German patent application 10 2013 108 419.2, filed on Aug. 5, 2013. The entire content of the priority applications are fully incorporated by reference herewith.

BACKGROUND

The present disclosure relates to a seal set, particularly to a piston seal or a piston rod seal, for sealing a primary side, particularly a low-pressure side, against a secondary side, particularly a high-pressure side, comprising a main body arranged to be received at a support part, and a slide ring for contacting a slide surface of a slide partner part. The disclosure further relates to a sealing arrangement for a piston or a piston rod, particularly for hydraulic applications, comprising at least one seal set of that kind.

Seal sets and sealing arrangements comprising seal sets of that kind and similar ones are for instance known from DE 24 61 455 A1 and DE 28 44 906 A1.

Through an in-house use of the applicant there is further known a seal set which is provided with a main body, wherein a radial circumferential receiving groove for a slide ring is formed at the main body, wherein the slide ring is, in a mounted state of the seal set, arranged in the receiving groove, and which contacts a slide partner part, for instance a piston rod or a cylinder surface. At the main body, there is further formed a sealing lip comprising a contact tip which may also contact the slide partner part in the mounted state. The slide ring comprises a one-sided, step-shaped recess which is formed in the slide ring at the side thereof facing the sealing lip and which is arranged, in the mounted state of the seal set, between the slide ring and the slide partner part.

Seal sets of that kind are generally used for sealing piston cylinder arrangements, for instance so-called hydraulic cylinders, and similar actuating elements which frequently involve relative sliding movements between involved components. Generally, the seal sets may be integrated in sealing arrangements which may for instance also involve bearing elements, guiding elements, covers, wipers and similar components.

In particular, those seal sets may be arranged as seal sets for cylindrical sealing surfaces. Generally, piston cylinder arrangements comprise operating mediums which may for instance involve hydraulic oil, water-oil-emulsions and/or pressurized air. Particularly when the piston cylinder arrangement is used for actuating purposes, huge pressure differences may be present between a pressurized side (here also: secondary side) and a side which is not exposed to the operating medium (here also: primary side).

In total, the seal sets shall, on the one hand side, ensure a good sealing also when huge pressure differences are present, and, on the other hand, generate as little friction as possible so as to avoid an excessive interference with the desired relative movements. Those design goals are basically mutually contradictory and therefore frequently require trade-offs when designing and constructing seal sets.

SUMMARY

In view of this, it is an object of the present disclosure to provide a seal set and a sealing arrangement comprising such a seal set which address at least some of the above-described drawbacks and pursue at least some of the above-described goals.

It is another object of the present disclosure to present a seal set and a sealing arrangement that are, at least in some embodiments, well-suited for highly dynamic applications.

It is another object of the present disclosure to provide a seal set and a sealing arrangement which provide a considerable robustness, and which may, at least in some exemplary embodiments, avoid costly consequential damages at the apparatus level.

It is a further object of the present disclosure to present a seal set and a sealing arrangement which are suited for heavy-load applications (heavy-duty applications).

These and other objects of the invention are achieved by a seal set, particularly a piston seal or a piston rod seal, for sealing a primary side, particularly a low-pressure side, against a secondary side, particularly a high-pressure side, comprising a main body, which is arranged to be received at a support part, and a slide ring for contacting a slide surface of a slide partner part, wherein the main body is arranged in an annular fashion and comprises a radial circumferential receiving groove for the slide ring, wherein further a radial circumferential sealing lip is provided at the main body which is formed between the receiving groove for the slide ring and a secondary-side end of the main body, wherein the sealing lip comprises a tip region and a conical ring surface adjoining the tip region, and wherein the slide ring, in the mounted state, at least sectionally covers the receiving groove, a primary-side adjoining surface adjoining the receiving groove, and the conical ring surface.

In accordance with this aspect, the slide ring namely may be supported at the main body in a more areal fashion and is, at that point, particularly not only limited to a region, wherein the receiving groove for the slide ring is formed at the main body. Hence, the slide ring may also come into contact with the slide surface of the slide partner part in a more areal fashion. Hence, the surface pressure of the slide ring and the slide surface of the slide partner part, respectively, may be significantly reduced in a mounted state. Even though sealing lip which is formed at the main body is still configured for contacting the slide surface of the slide partner part, it is beneficial to prevent an additional contact between the main body and the slide partner part as much as possible. Hence, undefined contact states may be avoided which may for instance involve undesired stick-slip-movement.

It goes without saying that the seal set may be basically formed as an internally sealing seal set but alternatively also as externally sealing seal set. An internally sealing seal set involves a slide ring which is generally arranged at an internal circumference of the main body. Hence, the main body may be for instance received at frame-side cylinder part, wherein the slide ring contacts a piston rod which forms the slide partner part and which is arranged to be moved with respect to the frame-side cylinder part in a relative movement, particularly a translational relative movement.

In the alternative, when the seal set is arranged as an externally sealing seal set, the main body may be for instance arranged at a piston, and may be provided with the receiving groove for the slide ring at an external circumference thereof, wherein the slide ring is arranged for contacting an (internal) cylinder surface which is arranged as the slide partner part, and wherein the slide ring and the piston are arranged to be moved with respect to the (internal) cylinder surface.

It therefore goes without saying that the embodiments and aspects described hereinafter may be applied to an internally sealing arrangement of the seal set and also to an externally sealing arrangement of the seal set. Accordingly, the support part may be arranged as a frame-side part, but also as a movable part. The seal set is used for sealing parts which are movable relative to one another, wherein it is basically immaterial, which of both involved parts, for instance the support part or the slide partner part is actually performing an absolute movement.

The sealing lip of the main body may comprise a circumferential sealing edge in the tip region. The sealing edge may be arranged for effecting a basically line contact between the main body and the slide partner part. In an exemplary embodiment, no further immediate direct contact is present between the main body and the slide partner part. The sealing lip of the main body may be particularly arranged as a sealing lip extending towards the secondary side in a sloping fashion. The conical ring surface of the sealing lip may adjoin the tip region of the sealing of the main body in a direction towards the primary side. The sealing lip of the main body may be arranged in an at least sectionally radially deflectable fashion.

Generally, the secondary side (also: high-pressure side) may be referred to as pressure side. Generally, the primary side (also: low-pressure side) may be referred to as so-called "pressure-free" side. It goes without saying that at the "pressure-free" side of course a (lower) pressure may be present, for instance the atmospheric pressure.

It has been observed that the seal set is particularly suited for highly dynamic applications involving huge relative velocities. To this end, particularly an optimized frictional behavior, thanks to the design, is referred to.

Seals of the afore-mentioned kind may be for instance used for building machines, industrial arrangements, for material-handling technology, and for similar applications. Generally, the seals may comprise nominal dimensions, for instance nominal diameters, which may for instance correspond to an inner diameter (of a piston rod) of about 10 mm to more than 600 mm. Depending on the utilized materials, for instance a temperature range from −50° C. (Celsius) to +200° C. (Celsius) may be covered. Sealing arrangements with seal sets of that kind may bear huge pressure differences. This may for instance involve pressure differences in the range of several hundred bar, up to a maximum pressure of about 450 bar to more than 650 bar.

In an exemplary refinement of the seal set, the main body and the slide ring are arranged in an annular fashion about a common longitudinal axis, wherein the main body and the slide ring, respectively, comprise an end surface at the primary-side end of the seal set, wherein the axial longitudinal extension of the end surfaces basically corresponds to one another.

In this way, the slide ring may entirely or nearly entirely cover the main body towards the primary side (low-pressure side) in such a way that in this region no contact of the slide partner part by the main body is imminent. It has been observed at seal sets known in the prior art that in the region of the primary-side end indeed a contact of the main body by the slide partner part might be present which may have adverse effects on the functionality and reliability.

The mentioned arrangement may have the further effect that for instance assembly errors, wherein the slide ring does not engage the receiving groove of the main body in the desired fashion, may be substantially avoided.

It further goes without saying that particularly the end surface of the main body may slightly extend beyond the end surface of the slide ring in the axial direction towards the primary side. In this way, when mounting the seal set, an undesired axial clamping of the slide ring may be avoided with certainty.

According to a further aspect, the slide ring comprises a radially circumferential groove-shaped recess at the side thereof facing away from the receiving groove of the main body, wherein the recess is arranged as a reservoir for an operating medium, particularly a drag oil.

In der groove-shaped recess, for instance surplus hydraulic oil and such like may be accommodated and temporarily stored. In this way, the lubricant supply, particularly of the slide ring, may be ensured, however without allowing an excessive transfer of lubricant to the primary side.

This embodiment is refined in that the recess of the slide ring is arranged between a secondary-side contact portion and a primary-side contact portion of the slide ring.

In this way, the slide ring may provide two sealing sections. The recess may be formed in the slide ring between the two sealing sections. Hence, the slide ring may contact the slide partner part at two positions which are axially spaced away from one another. In this way, maximum contact forces, particularly maximum surface pressure, may be reasonably reduced. It goes without saying that the primary-side contact portion and the secondary-side contact portion of the slide ring may be also arranged as sealing lips which extend in a sloping fashion towards the secondary side. In particular, at least one of the secondary-side contact portion and the primary-side contact portion may comprise a circumferential sealing edge which contacts the slide partner part in the mounted state.

It goes without saying that the main body, particularly the sealing lip thereof, and the slide ring may be at least sectionally deformed in a mounted state so as to ensure a sufficient sealing effect. It may be therefore envisaged that, as a result of the deformation, a sealing surface rather than a sealing edge may come into contact with the slide partner part.

In an appropriate refinement, the recess of the slide ring is basically formed in a section of the axial extension of the slide ring in which the slide ring comprises an annular protrusion which is adapted to the receiving groove of the main body.

The annular protrusion may be for instance arranged as a circumferential surface which is elevated with respect to neighboring surfaces of the slide ring. Hence, the slide ring may comprise a stepped cross section. In total, the radial installation space of the seal set may be minimized.

According to a further embodiment, the receiving groove of the main body is provided with a convexly formed shaped groove ground. In this way, a desired (radial) bias between the support part, the seal set and the slide partner part in the mounted state may be simply effected. The convex design of the groove ground may be for instance generated by means of a groove ground surface comprising a basically convex cross section.

According to a further embodiment, the sealing lip is integrated in the main body and particularly integrally arranged with the main body, wherein the sealing lip is axially rearwardly displaced with respect to a secondary-side end surface of the main body. An axial rearwardly displaced arrangement of the sealing lip may contribute to protecting the sealing lip against damages by neighboring components. Further, in case of a radial deflection of the sealing lip, a sufficiently large deformation space may be provided. The main body including the sealing lip may be for instance manufactured by means of a simple formative process.

In an exemplary embodiment, the sealing lip is arranged in a fashion axially protruding towards the secondary side. In this way, a tilt of the sealing lip towards the secondary side may be effected. Hence, the sealing lip may be coupled with the main body via a "virtual" living hinge, and may be deformed in a defined fashion in case of a load impact.

In an exemplary embodiment, the sealing lip, in the mounted state, is at least sectionally radially biased. It goes without saying that also the slide ring, particularly the secondary-side contact portion thereof and the primary-side contact portion thereof, may be at least sectionally radially biased when the seal set is mounted.

In an exemplary embodiment, the slide ring comprises a secondary-side conical supporting surface which is facing the main body, wherein the conical ring surface of the sealing lip is at least sectionally supported at the supporting surface in the mounted state.

On the one hand, this measure ensures that only a limited portion of the sealing lip of the main body may contact the slide partner part. Before further portions of the sealing lip would come into contact, the conical ring surface of the sealing lip will abut the supporting surface of the slide ring. In this way, the slide ring may act as a limit stop for the sealing lip. In total, the tribological behavior of the seal set in the mounted state may be significantly improved, particularly also for highly dynamic applications including huge relative velocities.

According to a further aspect, the conical ring surface of the sealing lip and the slide surface of the slide partner part define, in the mounted state, an acute angle α (alpha) therebetween which is opened towards the primary side. The conical supporting surface of the slide ring may comprise an inclination which corresponds to an inclination of the ring surface. Hence, the sealing lip of the main body may comprise, on the one hand, a huge sensitivity, for instance for being deflected in response tot slight but highly dynamic displacements of the slide partner part. On the other hand, the supporting surface of the slide ring may provide a limit stop which effectively prevents excessive deflections of the sealing lip.

In an exemplary embodiment, the main body is formed from an elastic plastic material, particularly from an elastomer, and that the slide ring is formed from a composite material comprising polytetrafluoroethylene (PTFE). Generally, the slide ring may consist of polytetrafluoroethylene and of composites comprising polytetrafluoroethylene which may be also referred to as PTFE-based compounds. For instance, the compound may involve a tribologically-effective filler material, particularly a friction-reducing filler material.

For instance, the support part including the sealing lip may be formed from a polyurethane material. Further elastic materials may be envisaged, for instance rubber material, thermoplastic elastomers and similar materials. It goes without saying that the main body may be provided with a friction-minimizing and/or wear-inhibiting coating. The slide may be generally composed of a friction-optimized and/or wear-minimizing composite material. The composite material may involve polytetrafluoroethylene and an appropriate filler material. The filler material may be particularly bronze. It may be also envisaged to form a compound of polytetrafluoroethylene and at least one filler material selected from the group comprising the following: glass fibers, carbon fibers, carbon, graphite, molybdenum disulfide, bronze, and organic filler material.

At least the main body or the slide ring may comprise processed surfaces, particularly significantly reduced roughness depth as for friction optimization.

In respect of the sealing arrangement, objects of the disclosure are achieved by a sealing arrangement for a piston or a piston rod, particularly for hydraulic applications, comprising at least one seal set in accordance with any of the herein-discussed aspects and embodiments which is received at a support part.

For further increasing the sealing effect, a sealing arrangement may be provided which comprises at least two seal sets of that kind which are arranged in a fashion axially offset from one another.

It is understood that the above-mentioned features of the disclosure and those to be explained in the following can be applied, not only in the respective specified combination, but also in other combinations of singly, without departing from the scope of the present disclosure.

BRIEF DESCRIPTION OF THE DRAWINGS

Further features and advantages of the disclosure are disclosed by the following description of a plurality of exemplary embodiments, with reference to the drawings, wherein:

FIG. 3 is a cross-sectional partial side view of a main body of a seal set;

FIG. 4 is a cross-sectional partial side view of a slide ring of a seal set which is arranged to be combined with the main body according to FIG. 3; and FIG. 5 is a cross-sectional partial side view of an externally sealing seal set contacting a slide partner part.

DETAILED DESCRIPTION OF EXEMPLARY EMBODIMENTS

Figure 1:
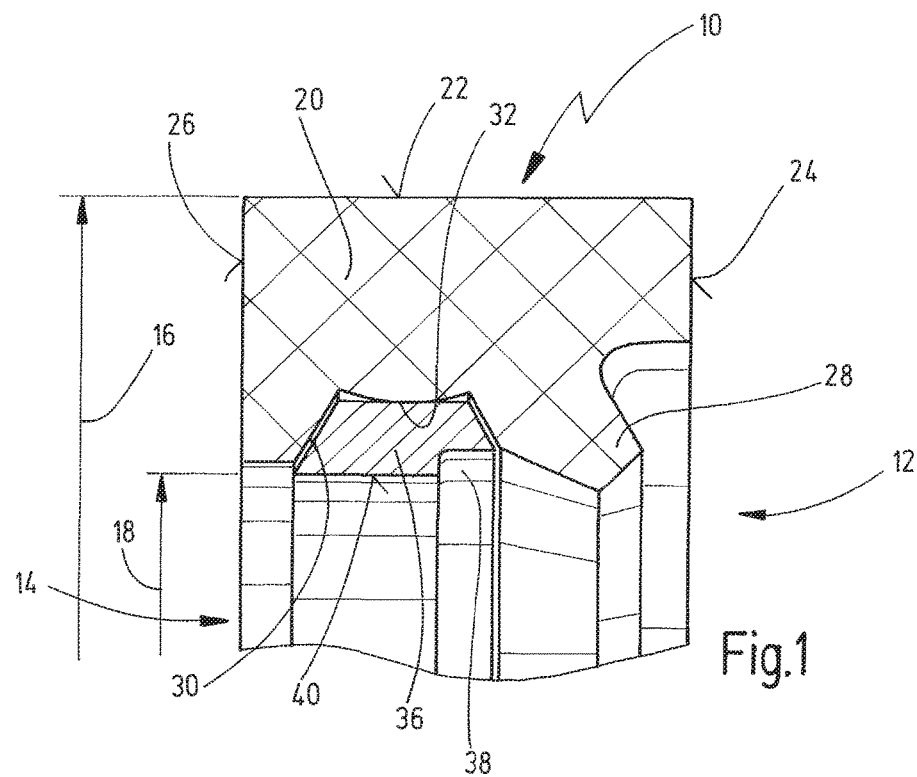
FIG. 1 is a cross-sectional partial side view an inwardly sealing seal set.

FIG. 1 shows a cross-sectional partial side view of a seal set 10 which is known through an in-house use of the applicant.

The seal set 10 is exemplarily formed as an inwardly sealing seal set. The seal set 10 is arranged for sealing a secondary side 12 against a primary side 14. The secondary side 12 may be particularly arranged as a high-pressure side. The primary side 14 may be particularly arranged as a low-pressure side. By way of example, nominal dimensions of the seal set 10 are indicated in FIG. 1 by arrows 16, 18. An arrow designated by 16 designates an outer diameter. An arrow designated by 18 indicates an inner diameter. The internally sealing seal set 10 is arranged for acting in a sealing manner at the inner diameter 18.

The seal set 10 comprises a main body 20 which may be for instance formed from polyurethane (PUR). The main body 20 comprises a receiving surface 22 for arrangement at a support part. At the main body 20, further a secondary-side end surface 24 and a primary-side end surface 26 is formed. Further, the main body 20 comprises a sealing lip 28.

Further, a radial circumferential receiving groove 30 extends along the main body 20, the receiving groove 30 providing a mounting feature for a slide ring 36.

The receiving groove 30 comprises a convexly formed groove ground 32. The slide ring 36 in received in the receiving groove 30 of the main body 20 and radially guided. The receiving groove 30 also ensures an axial guidance of the slide ring 36. It may be however envisaged to provide the axial guide of the slide ring 36 with a certain play. This slide ring 36 may be particularly formed from a composite material which is based on polytetrafluorethylene (PTFE) and provided of at least one filter material. The filler material may be for instance bronze. The slide ring 36 further comprises a step-shaped recess 38 which is formed in the slide ring 36 at the side thereof facing the sealing lip 28. Further, a (cylindrical) contact portion 40 is formed at the slide ring 36 which is arranged for contacting, in the mounted state of the seal set 10, a slide partner part, for instance a piston rod.

With reference to FIGS. 2 to 5, arrangements of alternative seal sets will be elucidated, the seal sets comprising certain exemplary design features, compared to the seal set 10 shown in FIG. 1.

Figure 2:
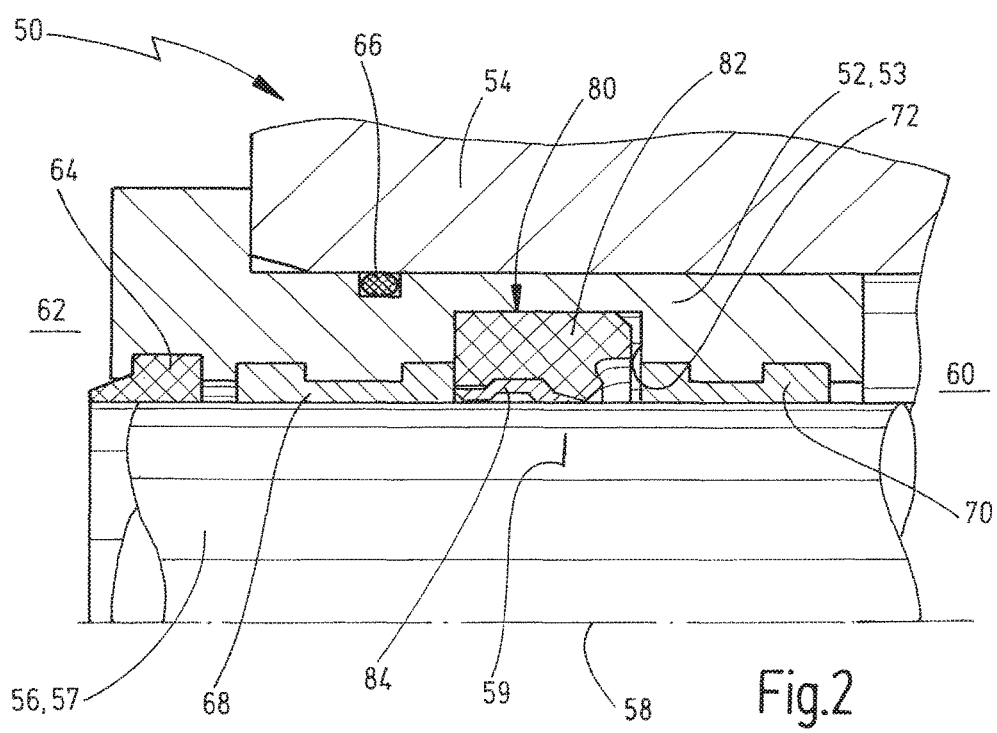
FIG. 2 is a cross-sectional partial side view of a sealing arrangement comprising an inwardly sealing seal set.

FIG. 2 shows a cross-sectional partial view of a sealing arrangement 50. The sealing arrangement 50 may involve a support part 52 which is exemplarily arranged as sleeve or bushing 53. The support part 52 is exemplarily arranged at a frame part 54. The sealing arrangement 50 encloses in the interior thereof a slide partner part 56 which is exemplarily arranged as a piston rod 57 (only partially shown in FIG. 2). The sealing arrangement 50 may be basically arranged in a fashion rotationally symmetric about a longitudinal axis 58. By means of the sealing arrangement 50, a secondary side 60 which is exposed to pressure may be sealed against a primary side 62 to which a smaller pressure is applied. For instance, the support part 52, the frame part 54 and the slide partner part 56 may be arranged as components of a hydraulic operating apparatus.

The sealing arrangement 50 may be provided with a plurality of sealing elements, guide elements and/or bearing elements so as to provide the desired functionality. For instance, the sealing arrangement 50 elucidated with reference to FIG. 2 comprises a wiper ring 64, a sealing ring 66 and guide elements 68, 70, all of which can be received at the support parts 52.

Further, a recess 72 is formed in the support part 52 which is for instance arranged as an annular circumferential recess. The recess 72 acts as a reception for a seal set 80. The seal set 30 is arranged between the support part 52 and the slide partner part 56. For instance, the seal set 80 may be secured by the recess 72 at the support part 52 in an axial and/or radial fashion. The seal set 80 comprises a main body 82 which contacts the recess 72. Further, a slide ring 84 is provided which contacts a slide surface or surface area 59 of the slide partner part 56 which is exemplarily arranged as piston rod 57. At the side thereof (here: at the external perimeter thereof) radially facing away from the slide surface 59 of the slide partner part 56, the slide ring 84 at least sectionally contacts the main body 82.

The seal set 80 may comprise nominal dimensions in different ranges, for instance a nominal inner diameter corresponding to a diameter (of a piston rod) from about 32 mm (millimeters) to more than 600 mm. Depending on the utilized materials, temperature ranges from −50° C. (Celsius) to +200° C. (Celsius) may be covered. Nevertheless, further dimensions and specifications may be envisaged and may be adapted to the respective application case.

FIGS. 3 and 4 show enlarged cross-sectional partial side views of the main body 82 and the slide ring 84 which correspond to one another in scale. It goes without saying that the scale of the illustration of FIG. 2 may differ from the scale of the illustrations in FIG. 3 and FIG. 4.

The main body 82 of the seal set 80 may for instance consist of polyurethane and may be basically arranged as an annular or rotationally symmetric part. The main body 82 comprises a secondary-side end surface 86 and a primary-side end surface 88. The secondary-side end surface 86 and the primary-side end surface 88 respectively form axial limit stops of the main body 82.

At the outer perimeter thereof, the main body 82 comprises a circumferential mating surface 90 which may be for instance arranged as a basically cylindrical surface. The mating surface 90 is exemplarily adapted to an inner diameter of the recess 72 of the support part 52 (refer also to FIG. 2). The main body 82 further comprises, at the secondary-side end thereof, a radial projection 92 which transitions into a chamfer 93. The radial projection 92 comprises a larger outer diameter than the mating surface 90. The radial projection 92 may contribute to position the seal set 80, particularly the main body 82 thereof radially at a reception in a defined, free-of-play fashion and with a desired bias. The chamfer 93 may be for instance used as an insertion aid and/or an insertion inclination.

The main body 82 further comprises, at the secondary-side end thereof, an indentation 94 which is axially rearwardly displaced with respect to the secondary-side end surface 86. A sealing lip 96 adjoins the indentation 94. The sealing lip 96 extends in an inclined fashion towards the secondary side 60. The sealing lip 96 comprises a tip region or a tip 98. Particularly, the tip region 98 may act as a sealing edge in the mounted state. The sealing lip 96 further comprises, at the primary side thereof, a conical ring surface 100. A further conical ring surface 102 is arranged at the secondary side of the sealing lip 96. Between the primary-side conical ring surface 100 and the secondary-side conical ring surface 102, a frontal surface 104 is formed. The sealing lip 96 is particularly radially deflectable. In this way, in the mounted state, a preloading may be generated which contributes to the sealing.

At the main body 82, in a direction towards the primary side 62, a receiving groove 106 adjoins the sealing lip 96. The receiving groove 106 is for instance arranged as an annular circumferential depression at an inner side of the main body 82. The receiving groove 106 comprises a groove ground 108 which is formed by a spherical or, viewed in cross-section, convexly shaped surface. Further, the receiving groove 106 comprises a primary-side boundary surface 112 and a secondary-side boundary surface 110. The boundary surfaces 110, 112 may be also referred to as primary-side flank 112 and secondary-side flank 110.

In a direction towards the primary side 62, a primary-side adjoining surface 114 adjoins the receiving groove 106. The primary-side adjoining surface 114 is, however, compared with the tip region 98 of the sealing lip 96 radially outwardly displaced in order to avoid any contact with the slide surface 59 of the slide partner part 56 as much as possible. In an exemplary embodiment, a seal set 80 comprises an arrangement enabling that, if at all, only a small region, particularly a tip region 98 of the sealing lip 96 may contact the sliding surface 59 of the slide partner part 56 in the mounted state.

The slide ring 84 described with reference to FIG. 4 is adapted to the design of the main body 82. The main body 82 and the slide ring 84 may jointly contribute in a desired fashion to provide, in an exemplary embodiment, defined contact relations in the mounted state. The slide ring 84 comprises a cross-section having a stepped arrangement. In particular, an approximately trapezoid-shaped protrusion 120 is provided at the slide ring 84, the protrusion 120 comprising a cylinder surface 122 which contacts, in the mounted state, the groove ground 108 of the receiving groove 106 of the main body 82 (FIG. 3). Hence, the slide ring 84 may be radially guided by the receiving groove 106 of the main body 82. Also an axial guidance may be effected, wherein, however, a certain axial play may be desired.

At the side thereof facing away from the protrusion 120, the slide ring 84 comprises a groove-shaped recess 124 which may be also arranged as an annular circumferential groove. The groove-shaped recess 124 may for instance serve as a reservoir or a pocket for an operation medium, particularly for drag oil, hydraulic oil, and such like. Since the groove-shaped recess 124 is formed in the region of the slide ring 84 in which also the protrusion 120 is provided, the integration of the groove-shaped recess 124 does not result in a substantial weakening of the cross-section of the slide ring 84. The groove-shaped recess 124 is formed at the side of the slide ring 84 facing the slide partner part 56 in the mounted state.

The groove-shaped recess 124 is arranged between a secondary-side contact portion 126 and a primary-side contact portion 128 of the slide ring 84. In other words, the slide ring 84 may comprise, in the mounted state, two contact portions 126, 128 which are radially spaced away from one another, in which the slide partner part may be contacted.

A primary-side end portion 130 may adjoin the primary-side contact portion 128. The primary-side end portion 130 ends in a primary-side frontal surface which may basically coincide with the primary-side end surface 88 of the main body 82 in a mounted state of the seal set 80. Nevertheless, in an exemplary embodiment, the primary-side end surface 88 of the main body 82 at least slightly extends beyond the primary-side end surface 130 of the slide ring 84 in the axial direction. In this way, the slide ring 84 may be protected against potentially adverse axial preloading in the mounted state.

In the region of the secondary-side contact portion 126, the slide ring 84 further comprises a secondary-side tip 132. In other words, the secondary-side contact portion 126 may form a secondary-side sealing lip of the slide ring 84 which ends at the secondary-side tip 132.

The tip 132 is arranged between a conical supporting surface 134 and a contact surface 136 facing away from the conical supporting surface 134. The contact surface 136 faces the slide surface 59 of the slide partner part 56 in the mounted state. The conical supporting surface 134 faces the sealing lip 96, particularly the conical ring surface 100 of the sealing surface 96, of the main body 82. The conical ring surface 100 may lean on the conical supporting surface 134 of the slide ring 84 when excessive deformation is present. Hence, an excessive increase of the contact surface between the main body 82 and the slide partner part 56 can be prevented.

The slide ring 84 further comprises a primary-side tip 138 at the primary-side contact portion 128. The primary-side tip 138 is arranged between the groove-shaped recess 124 and a primary-side contact surface 140. The primary-side contact portion 128 may be also referred to as primary-side sealing lip of the slide ring 84. Particularly the primary-side tip 138 may contact the slide surface 59 of the slide partner part 56 in the mounted state. At the side thereof facing the primary-side contact surface 140, the slide ring 184 further comprises an offset surface 142 which is radially spaced away from the cylinder surface 122 of the protrusion 120. In particular, the offset surface 142 is arranged in such a way that, in the mounted state, at least in a normal state, no immediate (radial) contact between the offset surface 142 of the slide ring 84 and the primary-side adjoining surface 114 of the main body 82 corresponding thereto is present, refer also to an offset dimension shown in FIG. 5 designated by e. In this way, also the slide ring 84 may, in case of excessive deflections of the slide partner parts 56, at least sectionally evade, at least partially, to compensate for these deformations.

Overall, the seal set 80 comprising the main body 82 and the slide ring 84 may, based on merely two components, provide for a highly-efficient sealing, also for highly dynamic applications involving huge relative velocities. The slide ring 84 may act as a supporting part for the sealing lip 96 of the main body 82, and may protect the sealing lip 96 against excessive deformations which might be adversely for operation.

As already mentioned herein before, the seal set 80 may be arranged as an externally sealing seal set. In this connection, FIG. 5 exemplarily elucidates an externally sealing seal set 80a. As explained before, the seal set 80 is provided with a main body 82a and a slide ring 84a. However, the slide ring 84a is received at an outer perimeter of the main body 82a. For instance, the seal set 80a may be received at an external surface or boundary surface of a piston (not shown in FIG. 5). As a result, the seal set 80a may, at the external perimeter thereof, contact a slide partner part 56a which is for instance arranged as (inner) cylinder 150. The embodiments and aspects described herein before may be simply transferred to the changed relationship of inner part and outer part.

What is claimed is:

1. A seal set for a piston and rod arrangement, for sealing a primary, low-pressure, side against a secondary, high-pressure, side, the seal seat comprising:
a main body having a primary-side end surface and a secondary-side end surface disposed opposite the primary-side end surface, and
a slide ring having an annular protrusion disposed between a circumferential offset surface and a conical supporting surface of the slide ring, wherein the conical supporting surface is offset from surfaces of the annular protrusion and the circumferential offset surface,
wherein the slide ring is arranged for contacting a slide surface of a slide partner part,
wherein the main body is arranged to be mounted to a support part,
wherein the main body is formed in an annular fashion and comprises:
a radial circumferential receiving groove disposed between the primary-side end surface and the secondary-side end surface for receiving the annular protrusion of the slide ring, wherein the receiving groove is provided with a convexly shaped groove ground,
a primary-side adjoining surface adjoining the primary-side end surface and the receiving groove, and
a radial circumferential sealing lip,
wherein the sealing lip is formed between the receiving groove for the slide ring and the secondary-side end surface of the main body,
wherein the sealing lip comprises a tip region and a conical ring surface adjoining the tip region, the conical ring surface tapering in a direction toward the receiving groove, and wherein the slide ring, in a mounted state, at least partially covers the receiving groove, the primary-side adjoining surface, and the conical ring surface of the main body, and wherein, in the mounted state, the conical supporting surface of the slide ring extends from the tip region along the conical ring surface of the main body.

2. The seal set as claimed in claim 1, wherein the receiving groove of the main body includes a conical secondary-side boundary surface disposed between the convexly shaped groove ground and the conical ring surface, the conical secondary-slide boundary surface tapering at a different angle than the conical ring surface.

3. The seal set as claimed in claim 1, wherein the slide ring comprises a radial circumferential groove-shaped recess at a side thereof facing away from the receiving groove of the main body, and wherein the groove-shaped recess is arranged as a reservoir for an operating fluid.

4. The seal set as claimed in claim 1, wherein the conical ring surface is arranged, in the mounted state, at an acute angle with respect to the slide surface of the slide partner part, and wherein the acute angle is opened towards the primary side.

5. A seal set for sealing a primary side against a secondary side, the seal set comprising a main body having a primary-side end surface and a secondary-side end surface disposed opposite the primary-side end surface, and a slide ring having an annular protrusion disposed between a circumferential offset surface and a conical supporting surface of the slide ring, wherein the conical supporting surface is offset from surfaces of the annular protrusion and the circumferential offset surface, wherein the slide ring is arranged for contacting a slide surface of a slide partner part, wherein the main body is arranged to be mounted to a support part, wherein the main body is formed in an annular fashion and comprises a radial circumferential receiving groove disposed between the primary-side end surface and the secondary-side end surface for receiving the annular protrusion of the slide ring, wherein the receiving groove is provided with a convexly shaped groove ground, a primary-side adjoining surface adjoining the primary-side end surface and the receiving groove, and a radial circumferential sealing lip, wherein the sealing lip is formed between the receiving groove for the slide ring and the secondary-side end surface of the main body, wherein the sealing lip comprises a tip region and a conical ring surface adjoining the tip region, the conical ring surface tapering in a direction toward the receiving groove, and wherein the slide ring, in a mounted state, at least partially covers the receiving groove, the primary-side adjoining surface, and the conical ring surface of the main body, and wherein, in the mounted state, the conical supporting surface of the slide ring extends from the tip region along the conical ring surface of the main body.

6. The seal set as claimed in claim 5, wherein the main body and the slide ring are arranged in an annular fashion about a common longitudinal axis, wherein the main body comprises an end surface at the primary-side end of the seal set, wherein the slide ring comprise an end surfaces at the primary-side end of the seal set, and wherein the end surfaces are arranged in a fashion basically flush with respect to one another.

7. The seal set as claimed in claim 5, wherein the slide ring comprises a radial circumferential groove-shaped recess at a side thereof facing away from the receiving groove of the main body, and wherein the groove-shaped recess is arranged as a reservoir for an operating fluid.

8. The seal set as claimed in claim 7, wherein the recess of the slide ring is arranged between a secondary-side contact portion and a primary-side contact portion of the slide ring.

9. The seal set as claimed in claim 7, wherein the recess of the slide ring is basically arranged in a portion of the axial extension of the slide ring in which the slide ring comprises an annular protrusion that is adapted to the receiving groove of the main body.

10. The seal set as claimed in claim 5, wherein the receiving groove of the main body includes a conical secondary-side boundary surface disposed between the convexly shaped groove ground and the conical ring surface, the conical secondary-side boundary surface tapering at a different angle than the conical ring surface.

11. The seal set as claimed in claim 5, wherein the sealing lip is integrated in the main body.

12. The seal set as claimed in claim 11, wherein the sealing lip is integrally formed with the main body, and wherein the sealing lip is rearwardly displaced in the axial direction with respect to a secondary-side end surface of the main body.

13. The seal set as claimed in claim 5, wherein the sealing lip is arranged in a fashion axially protruding towards the secondary side.

14. The seal set as claimed in claim 5, wherein, in the mounted state, the sealing lip is at least sectionally radially biased.

15. The seal set as claimed in claim 5, wherein the slide ring comprises a secondary-side conical supporting surface facing the main body, and wherein the conical ring surface of the sealing lip is, in the mounted state, at least sectionally supported at the supporting surface.

16. The seal set as claimed in claim 5, wherein the conical ring surface is arranged, in the mounted state, at an acute angle with respect to the slide surface of the slide partner part, and wherein the acute angle is opened towards the primary side.

17. The seal set as claimed in claim 5, wherein the main body is formed from an elastic plastic material.

18. The seal set as claimed in claim 5, wherein the slide ring is made from a composite material comprising polytetrafluoroethylene and at least one tribologically-effective filler material.

19. A sealing arrangement for a piston and rod arrangement of a hydraulic apparatus, comprising a support part, a slide partner part and at least one seal set for sealing a primary side against a secondary side, the seal set comprising a main body having a primary-side end surface and a secondary-side end surface disposed opposite the primary-side end surface, and a slide ring having an annular protrusion disposed between a circumferential offset surface and a conical supporting surface of the slide ring, wherein the conical supporting surface is offset from surfaces of the annular protrusion and the circumferential offset surface, wherein the slide ring is arranged for contacting a slide surface of the slide partner part, wherein the main body is arranged to be mounted to the support part, wherein the main body is formed in an annular fashion and comprises a radial circumferential receiving groove disposed between the primary-side end surface and the secondary-side end surface for receiving the annular protrusion of the slide ring, wherein the receiving groove is provided with a convexly shaped groove round, a primary-side adjoining surface adjoining the primary-side end surface and the receiving groove, and a radial circumferential sealing lip, wherein the sealing lip is formed between the receiving groove for the slide ring and the secondary-side end surface of the main body, wherein the sealing lip comprises a tip region and a conical ring surface adjoining the tip region, the conical ring surface tapering in a direction toward the receiving groove, and wherein the slide ring, in a mounted state, at least partially covers the receiving groove, the primary-side adjoining surface, and the conical ring surface, and wherein, in the mounted state, the conical supporting surface of the slide ring extends from the tip region along the conical ring surface.

20. The sealing arrangement as claimed in claim 19, comprising at least two seal sets which are arranged in a fashion axially offset from one another.

* * * * *